US006751258B2

(12) United States Patent
Zhong

(10) Patent No.: US 6,751,258 B2
(45) Date of Patent: Jun. 15, 2004

(54) VERTICAL SCALING OF INTERLACED VIDEO IN THE FREQUENCY DOMAIN

(75) Inventor: Zhun Zhong, Croton-on-Hudson, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 527 days.

(21) Appl. No.: 09/867,970

(22) Filed: May 30, 2001

(65) Prior Publication Data

US 2002/0181582 A1 Dec. 5, 2002

(51) Int. Cl.$^7$ ................................................ H04B 1/66
(52) U.S. Cl. ................................................ 375/240.25
(58) Field of Search ....................... 375/240.25, 240.15, 375/240.21, 240.16; 348/443, 445, 448, 399, 441, 571, 446, 459, 610; H04N 7/12

(56) References Cited

U.S. PATENT DOCUMENTS

| 5,532,820 A | * | 7/1996 | Strolle et al. .................. 386/46 |
| 5,561,617 A | * | 10/1996 | van der Wal ............... 708/308 |
| 5,825,424 A | * | 10/1998 | Canfield et al. ........ 375/240.15 |
| 5,874,772 A | * | 2/1999 | Tsujino et al. ............... 257/607 |
| 6,184,935 B1 | * | 2/2001 | Iaquinto et al. ............. 348/441 |
| 6,233,357 B1 | * | 5/2001 | Li et al. ...................... 382/248 |

OTHER PUBLICATIONS

Yim et al; "An efficient method for DCT–domain image resizing with mixed field/frame mode macroblock"; IEEE Transactions on circuits and systems for video technology, IEEE INC. New York, US ; vol. 9, #5, Aug. 1999, pp. 696–700.*

Kim et al; "DCT domain filter for ATV down conversion"; IEEE Transactions on Consumer Electronics, IEEE INC. New York, US. vol. 43, #4, Nov. 1, 1997; pp. 1074–1078.*

Kresch et al; "Fast dct domain filtering using the DCT and the DST"; IEEE; vol. 8, #6; Jun. 1999; pp. 821–833.*

Merhav et al; Fast algorithms for DCT domain image down sampling and for inverse motion compensation; IEEE; vol. 7, #3; Jun. 1, 1997; pp. 468–476.*

Dugad et al; "A fast schem for downsampling and upsampling in the DCT domain"; IEEE: Oct. 24, 1999; pp. 909–913.*

* cited by examiner

*Primary Examiner*—Nhon Diep

(57) ABSTRACT

A system and method for filtering interlaced video in the DCT domain. The invention implements an even length symmetric filter necessary for filtering the bottom field of pixel data using the steps of: decomposing the even symmetric spatial filter design into two identical odd length symmetric filter designs have a one pixel phase difference therebetween; creating a discrete cosine transform (DCT) filter that corresponds to the odd length symmetric filter designs; filtering the field of interlaced video data in the DCT domain using DCT filter to create a set of filtered DCT data; converting the set of filtered DCT data into a set of spatial domain data; and filtering the spatial domain data with a [1,1] filter.

19 Claims, 2 Drawing Sheets

VERTICAL SCALING OF INTERLACED VIDEO IN THE FREQUENCY DOMAIN

BACKGROUND OF THE INVENTION

1. Technical Field

The present invention relates to filtering systems, and more particularly relates to a system and method for filtering interlaced video in the frequency domain.

2. Related Art

As digital TV gradually begins to dominate-the TV market and other digital video applications become more desirable, the demand for devices having advanced video processing capabilities becomes stronger and stronger. Accordingly, the ability to effectively process, and in particular filter, video data has become extremely important.

In digital signal processing systems, it is well recognized that data can be filtered in either the spatial domain or frequency domain. It is also well recognized that filtering in the frequency domain is much simpler (i.e., less computationally intensive). However, the cost of converting data from the spatial domain to the frequency domain and back can potentially outweigh any savings. In addition, certain types of spatial domain filters cannot be implemented in the frequency domain in an efficient manner. Thus, limitations exist on when frequency domain filtering can be effectively utilized.

Many image/video compression techniques, such as MPEG-n (including MPEG-1, MPEG-2, MPEG-4, etc.), JPEG (which is a standard for image compression), and H.26x (including H.261, H.263 . . . ), operate on data in the frequency or DCT (discreet cosine transform) domain. One such example is MPEG-2, which was designed for coding interlaced images at transmission rates above 4 million bits per second. The MPEG-2 standard is used for various applications, such as digital television (DTV) broadcasts, digital versatile disk (DVD) technology, and video storage systems.

One of the important components of any of the above compression-based systems is the decoder, which converts a bitstream of compressed data into pixel images. One of the main functional blocks found in a decoder is an inverse discrete cosine transform (IDCT) system, which converts DCT data into pixel data. Accordingly, MPEG-2 decoders and the like process frequency domain (i.e., DCT) data and include an IDCT system for converting frequency domain data to spatial domain data. Thus, in cases where filtering is required, decoders provide an excellent opportunity to effectively filter frequency domain data.

One case in which filtering is required in decoders involves down scaling, which is needed to avoid aliasing. However, when filtering interlaced pictures for downscaling purposes, different filters must be applied to the top field and bottom field of the interlaced picture. In particular, if an odd length symmetric filter is used to filter the top field, an even length filter symmetric filter is needed to filter the bottom field. The reason for this results from the fact that the bottom field needs a different phase shift to keep proper interlacing after the downscaling. The odd length symmetric filter has zero phase shift whereas the even length symmetric filter has $\pi/2$ (half pixel) phase shift. Unfortunately, an even length symmetric filter cannot be easily converted into an equivalent frequency domain filter and take the advantage of frequency domain filtering. Accordingly, a need exist to provide a frequency domain filtering system for down scaling interlaced video.

SUMMARY OF THE INVENTION

This invention overcomes the above-mentioned problems, as well as others, by providing a frequency domain filtering system that efficiently filters top and bottom field pixel data in an interlaced video.

In a first aspect, the invention provides a method for filtering interlaced video, comprising the steps of: decomposing an even length symmetric filter into a pair of identical odd length symmetric filters, wherein the pair of identical odd length symmetric filters have a one pixel phase difference; converting one of the odd length symmetric filters to a corresponding frequency domain filter; applying the corresponding frequency domain filter to a field of frequency domain pixels to generate a filtered set of frequency domain pixels; converting the filtered set of frequency domain pixels into a set of spatial domain pixels; and adding adjacent pixels from the set of spatial domain pixels to generate a filtered field of spatial domain pixels.

In a second aspect, the invention provides a decoder system for filtering interlaced video, comprising: a first filter system for processing a first field of discrete cosine transform (DCT) pixel data, wherein the first filter system comprises a DCT filter that corresponds to a first odd length symmetric spatial filter; and a second filter system for processing a second field of DCT pixel data, wherein the second filter system comprises: (a) a second DCT filter for filtering the second field of DCT pixel data and generating a set of filtered DCT pixel data, wherein the second DCT filter corresponds to a second odd length symmetric spatial filter; and (b) a spatial domain filter for combining adjacent spatial domain pixel data values.

In a third aspect, the invention provides a program product stored on a recordable medium, which when executed, filters a first and a second field of discrete cosine transform (DCT) data, the program product comprising: a first filter system having a first DCT filter corresponding to an odd length symmetric spatial filter for processing the first field; and a second filter system for processing the second field, having: (a) a second DCT filter corresponding to a second odd length symmetric spatial filter; and (b) a [1,1] filter for further filtering results from the second DCT filter.

In a fourth aspect, the invention provides a method of replicating an even length symmetric filter design required for processing a field of interlaced video data, comprising the steps of: decomposing the even length symmetric spatial filter design into two identical odd length symmetric filter designs have a one pixel phase difference therebetween; creating a discrete cosine transform (DCT) filter that corresponds to the odd length symmetric filter designs; filtering the field of interlaced video data in the DCT domain using the DCT filter to create a set of filtered DCT data; converting the set of filtered DCT data into a set of spatial domain data; and filtering the spatial domain with a [1,1] filter.

BRIEF DESCRIPTION OF THE DRAWINGS

The preferred exemplary embodiment of the present invention will hereinafter be described in conjunction with the appended drawings, where like designations denote like elements, and.

DETAILED DESCRIPTION OF THE INVENTION

Overview

Figure 1:
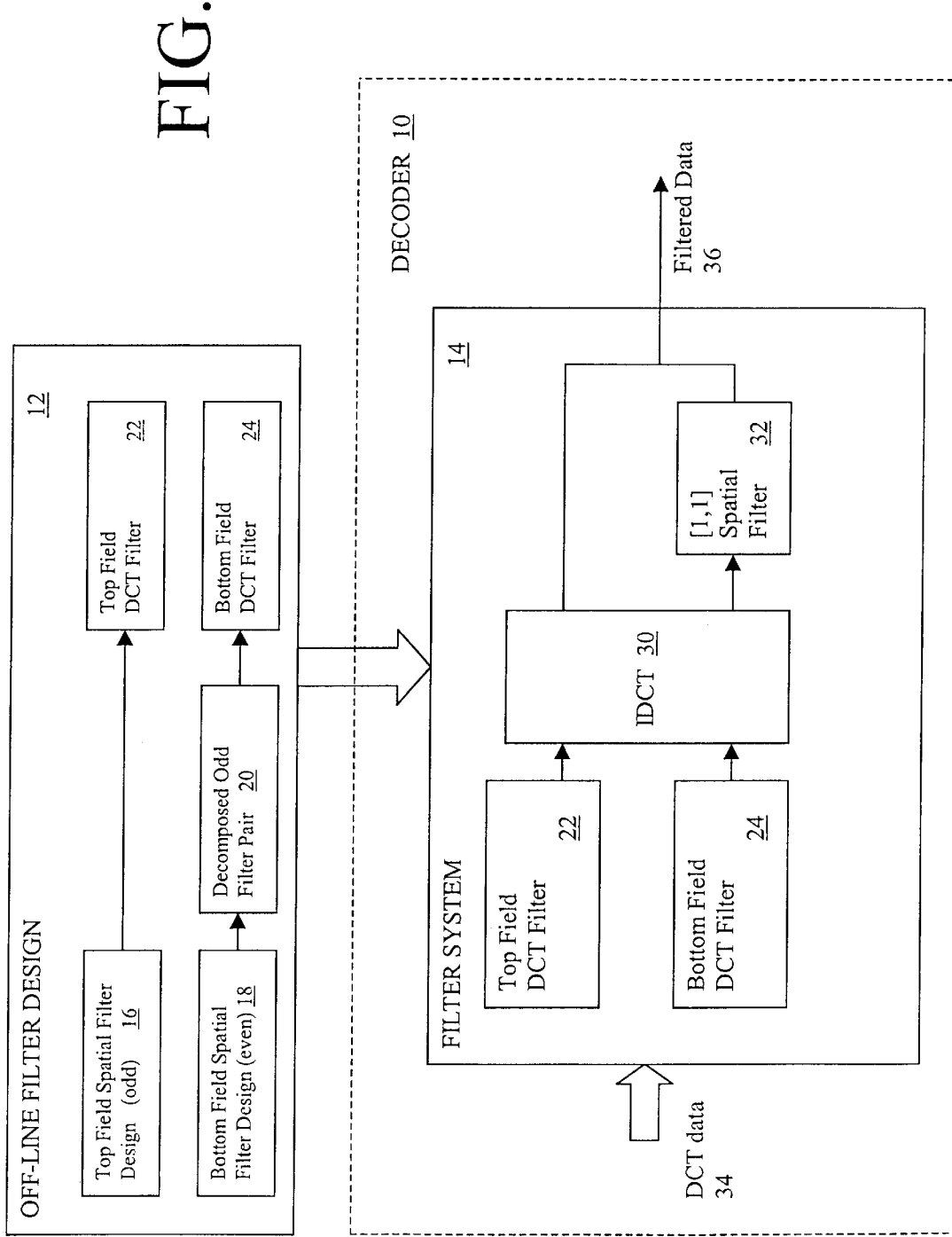
FIG. 1 depicts for filtering interlaced video data in accordance with a preferred embodiment of the present invention.

The present embodiment is directed at a solution for providing video down conversion in a system that processes interlaced video data, such as an MPEG-2 decoder. Although the exemplary embodiments are described herein with reference to an MPEG-2 decoder system, it is understood that the invention may apply to any frequency domain system where filtering is required. Video down conversion, which uses a technique called down sampling, is the process of reducing the resolution (i.e., number of pixels) contained in video data. For example, a down sampling applied on 10 pixels with a scaling factor of 2 will result in 5 pixels. Down sampling may be required, for instance, in a decoder system in which it is necessary and/or desirable to scale back power consumption. Typically, down sampling is accomplished using some type of filtering technique.

It is recognized that filtering in the frequency or DCT (discrete cosine transform) domain can be readily achieved given the fact that a DCT domain filter is equivalent to a block mirror filter in the spatial domain (given some assumptions). It is also recognized that filtering in the DCT domain is often a much more efficient solution than filtering in the spatial domain. In particular, filtering in the DCT domain generally requires only simple multiplication operations, while filtering in the spatial domain requires complex convolution operations. For example, applying a three tap [1, 2, 1] spatial filter to a field of pixels ($A_0, A_1, A_2, A_3 \ldots$) to obtain a filtered pixel values $B_1, B_2, B_3, \ldots$ would require the following computations:

$B_1 = A_0 + 2A_1 + A_2$,
$B_2 = A_1 + 2A_2 + A_3$,
$B_3 = A_2 + 2A_3 + A_4$, etc.

Conversely, applying a corresponding DCT domain filter operating on a corresponding field of DCT pixel data ($x_0, x_1, x_2 \ldots$) to obtain filtered DCT pixel values ($y_0, y_1, y_2 \ldots$) would require only simple multiplications. For example:

$y_0 = x_0 * w_0$,
$y_1 = x_1 * w_1$,
$y_2 = x_2 * w_2$, etc., where $w_0, w_1, w_2 \ldots$ form a weighting vector (i.e., the filter values of the DCT filter) that corresponds to an odd length spatial domain filter, e.g., [1,2,1] (Note that there are no weighting vectors that correspond to even length symmetric spatial domain filters. Such weighting vectors are only available for odd length symmetric spatial domain filters.) The resulting filtered DCT pixel values $y_0, y_1, y_2 \ldots$, can be converted into filtered spatial pixel values using, for instance, an IDCT system.

Interlaced video is comprised of a series of frames, and each frame consists of two fields, a top field and a bottom field. The 1st, 3st, 5th, . . . , lines of the frame form the top field; whereas the 2nd, 4th, 6th, . . . , lines of the frame form the bottom field. In other words, each field takes every other line from the frame, in an interlaced manner. As noted, in order to implement a DCT domain filter for processing interlaced video, separate filters must be used for the top and bottom fields in order to obtain a properly interlaced output.

If a zero phase shift filter (odd length symmetric filter) is applied to the top field, then a filter with a half pixel phase shift (even length symmetric filter) should be used for the bottom field. However, one of the assumptions for implementing a block mirror filter equivalent in the DCT domain is that only odd length symmetric filters can be used. The below described filter system provides a solution for implementing an even length symmetric filter.

Filter System

Referring now to FIG. 1, a decoder system 10 is shown having filter system 14. Filter system 14 receives DCT data 34 and outputs filtered data 36. Filter system 14 generally comprises a top field DCT filter 22, a bottom field DCT filter 24, IDCT 30 (which, as noted above, is a standard decoder component), and a [1,1] spatial filter 32. Top field DCT filter 22 and bottom field DCT filter 24 are designed "off-line" by off-line filter design system 12.

As noted, in order to implement a filter suitable for filtering interlaced video, two filter designs are required; namely, an odd length top field filter design 16, and an even length bottom field filter design 18. In order to implement the even length bottom field filter design 18 in the DCT domain, the even length bottom field filter design 18 is decomposed into a pair of identical odd length symmetric filters 20, having a one-pixel phase difference therebetween. A method for decomposing an even length symmetric filter into a pair of identical odd length symmetric filters with a one-pixel phase shift is illustrated as follows.

Consider a 2N tap even length symmetric filter (where N is an integer) having the following coefficients:

$E_1, E_2, \ldots E_N, E_{N+1}, \ldots E_{2N-1}, E_{2N}$;

in which $E_1 = E_{2N}$; $E_2 = E_{2N-1}$; . . . $E_N = E_{N+1}$ (due to symmetry). A target odd length symmetric filter has 2N–1 taps, i.e., one tap less than the even length symmetric filter, having the following coefficients:

$O_1, O_2, \ldots O_{N-1}, O_N, O_{N+1}, \ldots O_{2N-2}, O_{2N-1}$;

in which $O_1 = O_{2N-1}$; $O_2 = O_{2N-2}$; . . . $O_i = O_{2N-i}$; . . . $O_{N-1} = O_{N+1}$ (also due to symmetry). If there exists two odd length symmetric filters, with a one pixel shift, then:

$$O_1 = E_1$$
$$O_2 + O_1 = E_2$$
$$O_3 + O_2 = E_3$$
$$\vdots$$
$$O_i + O_{i-1} = E_i$$
$$\vdots$$
$$O_N + O_{N-1} = E_N$$
$$\vdots$$
$$O_{2N-1} + O_{2N-2} = E_{2N-1}$$
$$O_{2N-1} = E_{2N}$$

$O_1, O_2 \ldots O_{N-1}$, and $O_N$ can be calculated as follows: $O_1 = E_1$; $O_2 = E_2 - O_1$; $O_3 = E_3 - O_2$; . . . $O_i = E_i - O_{i-1}$; . . . $O_N = E_N - O_{N-1}$. (The remaining odd coefficients $O_{N+1} \ldots O_{2N-1}$ are known due to symmetry.)

As an example, consider the even length symmetric spatial filter $[E_1, E_2, E_3, E_4] = [1,3,3,1]$. The [1,3,3,1] spatial domain filter can be decomposed into a pair of odd-length filters $[O_1, O_2, O_3]$ having a one pixel phase difference using the equations calculated above, namely, $O_1 = E_1$, $O_2 = E_2 - O_1$, $O_3 = E_3 - O_2$. Plugging the values into the equations yields $O_1 = 1$, $O_2 = 3 - 1 = 2$, and $O_3 = 3 - 2 = 1$, which results in a [1,2,1] filter.

The decomposed even length filter can then be implemented in a two-step filter design comprising: (1) a [1,2,1] filter, and (2) a [1,1] filter. To illustrate, consider the above example in which the [1,3,3,1] spatial domain filter is applied to the field of pixels ($A_0, A_1, A_2, A_3 \ldots$) to arrive at filtered pixel data $B_0, B_1, B_2, \ldots$. In this case, the [1,2,1] filter would first be applied to successive subsets of pixel values to generate a set of intermediate filtered pixel results $C_0, C_1, C_2, \ldots$ as follows:

$C_0 = A_0 + 2A_1 + A_2$
$C_1 = A_1 + 2A_2 + A_3$
$C_2 = A_2 + 2A_3 + A_4$, etc.

The intermediate results $C_0, C_1, C_2, \ldots$ would then be filtered by a [1,1] filter to arrive at the filtered pixel data $B_0, B_1, B_2, \ldots$, as follows:

$B_0 = C_0 + C_1 = A_0 + 2A_1 + A_2 + A_1 + 2A_2 + A_3$
$= A_0 + 3A_1 + 3A_2 + A_3$
$B_1 = C_1 + C_2 = A_1 + 2A_2 + A_3 + A_2 2A_3 A_4$
$= A_1 + 3A_2 + 3A_3 + A_4$, etc.

As can be seen, the results from the two step filter process using an odd length filter to perform the first step are the same as that of the even length filter. Given this result, a DCT filter (e.g., $w_0, w_1, w_2 \ldots$) corresponding to the decomposed odd length filter (e.g., the [1,2,1] filter) can be created, and used to perform the first filtering step in the DCT domain.

Accordingly, once the bottom field spatial filter design 18 has been decomposed 20, a corresponding bottom field DCT filter 22 (as well as a corresponding top field DCT filter 24) can be established. The process of creating corresponding DCT filters 22 and 24 from odd length symmetric spatial filters is well known in the art. Once the DCT filters 22 and 24 have been established, they can be implemented in filter system 14. As discussed above, the corresponding DCT filters 22 and 24 will each comprise a set of filter values, i.e. a weighting vector, that are used to filter DCT data 34.

DCT data 34 comprises interlaced video data with an even and odd field each having, for example, eight DCT data values. The even and odd fields are processed in filter system 14 by top field DCT filter 22 and bottom field DCT filter 24, respectfully. The top field is filtered by top field DCT filter 22 in a straightforward manner and generates a weighted or filtered field of DCT data. The filtered DCT data is then passed through IDCT 30, which provides a filtered top field of spatial domain data.

Conversely, the bottom field of DCT data must go through a two-step filter process. First, the bottom field data is filtered by bottom field DCT filter 24, which generates a set of weighted or filtered DCT data. The set of filtered DCT data is then converted into a set of spatial domain data by IDCT 30. Next, the set of spatial domain data is filtered by a [1,1] spatial domain filter 32, which generates a filtered bottom field of spatial domain data. The top and bottom fields of filtered spatial data can then be interlaced and output as filtered data 36.

Thus, the even filter design 18 is decomposed into a pair of identical odd length filters 20, whose corresponding DCT filter is used to perform the complex filtering operations on the bottom field DCT data. After the bottom field results are converted into the spatial domain, a simple [1,1] spatial domain filter is used to add the results of adjacent spatial domain data values.

Figure 2:
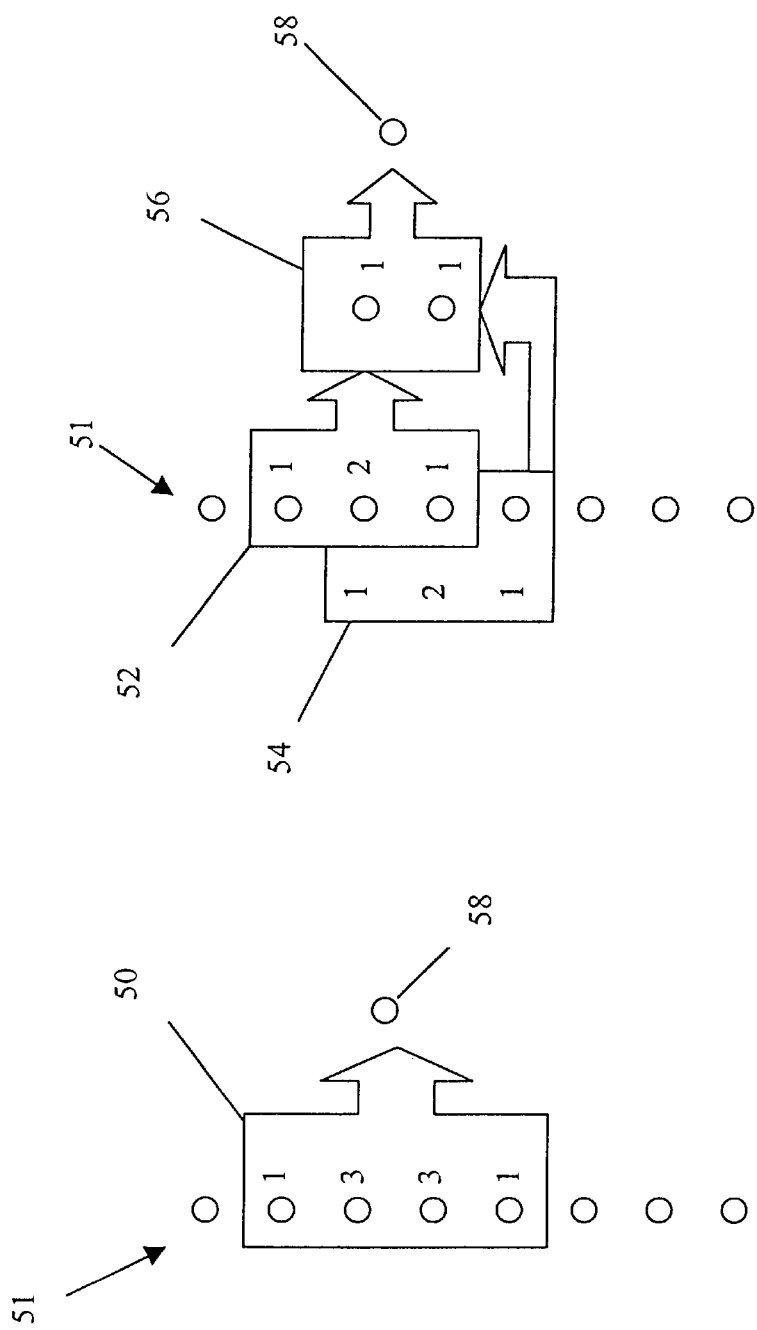
FIG. 2 depicts an example of an even length filter decomposed into a pair of odd length filters.

Referring now to FIG. 2, a pictorial example depicts how an even length symmetric spatial domain filter 50 is implemented as a pair of identical odd length symmetric filters 52 and 54. As shown on the left hand side of the figure, filter 50 operates on a set of pixels 51. Filter 50 has filter coefficients of [1,3,3,1] and is shown operating on the second, third, fourth, and fifth pixels (from the top). Filter 50 may be implemented in the spatial domain by, for example, multiplying the filter coefficients with the respective pixel data and adding the results together.

Referring to the right-hand side of FIG. 2, filter 50 has been decomposed into a pair of identical odd length filters 52 and 54, each having filter coefficients of [1,2,1]. Here, because the filters 52 and 54 are one pixel out of phase, filter 52 operates on the second, third and fourth pixel (from the top), while filter 54 operates on the third, fourth and fifth pixel. The pair of results of the two filtering operations are then sent to a secondary filter 56, having filter coefficients of [1,1]. Secondary filter 56 essentially adds the results of the two filters 52 and 54 together to arrive at final result 58, which is the same as that of filter 50. It is understood that the filter designs (e.g., size and weight of the coefficients) described herein are for exemplary purposes only. Moreover, the exemplary filter coefficients used above are for illustration purposes and they are not normalized. Thus, in a real-world application, the [1, 3, 3, 1] filter coefficients would be normalized as [1, 3, 3, 1]/8, so that the sum of the filter coefficient always equals one.

It is also understood that the systems, functions, methods, and modules described herein can be implemented in hardware, software, or a combination of hardware and software. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. The present invention can also be embedded in a computer program product, which comprises all the features enabling the implementation of the methods and functions described herein, and which—when loaded in a computer system—is able to carry out these methods and functions. Computer program, software program, program, program product, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of the invention have been presented for purposes of illustration and description. They are not intended to be exhaustive or to limit the invention to the precise form disclosed, and obviously many modifications and variations are possible in light of the above teachings. Such modifications and variations that are apparent to a person skilled in the art are intended to be included within the scope of this invention as defined by the accompanying claims.

What is claimed is:

1. A method for filtering interlaced video, comprising the steps of:
    decomposing an even length symmetric filter into a pair of identical odd length symmetric filters, wherein the pair of identical odd length symmetric filters have a one pixel phase difference;
    converting one of the odd length symmetric filters to a corresponding frequency domain filter;
    applying the corresponding frequency domain filter to a field of frequency domain pixels to generate a filtered set of frequency domain pixels;
    converting the filtered set of frequency domain pixels into a set of spatial domain pixels; and
    adding adjacent pixels from the set of spatial domain pixels to generate a filtered field of spatial domain pixels.

2. The method of claim 1, wherein the frequency domain is a discrete cosine transform (DCT) domain.

3. The method of claim 1, wherein the field of frequency domain pixels is the bottom field of the interlaced video.

4. The method of claim 3, further comprising the step of applying a second DCT filter to a top field of frequency domain pixels in the interlaced video.

5. The method of claim 1, wherein the step of applying the corresponding frequency domain filter to the field of frequency domain pixels includes the step of multiplying the field of frequency domain pixels with a weighting vector.

6. A decoder system for filtering interlaced video, comprising:
a first filter system for processing a first field of discrete cosine transform (DCT) pixel data, wherein the first filter system comprises a DCT filter that corresponds to a first odd length symmetric spatial filter; and
a second filter system for processing a second field of DCT pixel data, wherein the second filter system comprises:
a second DCT filter for filtering the second field of DCT pixel data and generating a set of filtered DCT pixel data, wherein the second DCT filter corresponds to a second odd length symmetric spatial filter; and
a spatial domain filter for combining adjacent spatial domain pixel data values.

7. The decoder system of claim 6, wherein the second odd length symmetric spatial filter was decomposed from an even length symmetric filter as one of a pair of odd length symmetric filters having a one pixel phase difference.

8. The decoder system of claim 7, wherein the pair of odd length symmetric filters replicates an even length symmetric filter suitable for processing the second field of interlaced video.

9. The decoder system of claim 6, wherein the first field of interlaced video data comprises a top field of data and the second field of interlaced video data comprises a bottom field of interlaced video data.

10. The decoder system of claim 6, wherein the spatial domain filter comprises a [1,1] filter.

11. The decoder system of claim 6, further comprising an inverse discreet cosine transform system for converting the set of filtered DCT pixel data to a set of spatial domain pixel values.

12. A program product stored on a recordable medium, which when executed, filters a first and a second field of discrete cosine transform (DCT) data, the program product comprising:
a first filter system having a first DCT filter corresponding to an odd length symmetric spatial filter for processing the first field; and
a second filter system for processing the second field, having:
a second DCT filter corresponding to a second odd length symmetric spatial filter; and
a [1,1] filter for filtering results from the second DCT filter.

13. The program product of claim 12, wherein the second odd length symmetric spatial filter was decomposed as one of a pair of filters from an even length symmetric spatial filter.

14. The program product of claim 13, wherein the pair of filters replicates an even length symmetric spatial filter designed for processing the second field of DCT data.

15. The program product of claim 12, wherein the [1,1] filter operates on data in a spatial domain.

16. A method of replicating an even length symmetric spatial filter design required for processing a field of interlaced video data, comprising the steps of:
decomposing the even length symmetric spatial filter design into two identical odd length symmetric filter designs have a one pixel phase difference therebetween;
creating a discrete cosine transform (DCT) filter that corresponds to the odd length symmetric filter designs;
filtering the field of interlaced video data in the DCT domain using DCT filter to create a set of filtered DCT data;
converting the set of filtered DCT data into a set of spatial domain data; and
filtering the spatial domain data with a [1,1] filter.

17. The method of claim 16, wherein the step of converting the set of filtered DCT data into the set of spatial domain data is accomplished with an inverse discrete cosine transform (IDCT) system.

18. The method of claim 16, wherein the step of filtering the field of interlaced video data comprises the step of multiplying DCT data values with a weighted vector.

19. The method of claim 17, wherein the weighted vector correspond to the odd length symmetric filter designs.

* * * * *